(No Model.)
G. O. RINMAN & J. ZIMMERMAN.
MEAT CUTTING MACHINE.
No. 382,192. Patented May 1, 1888.
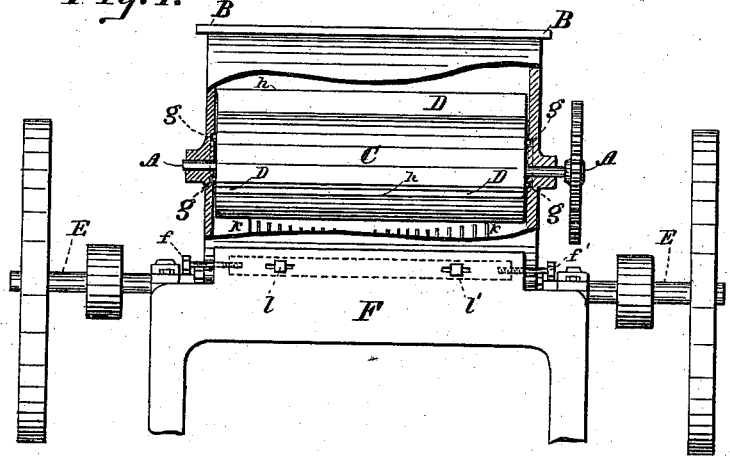
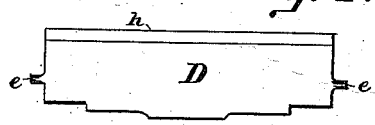
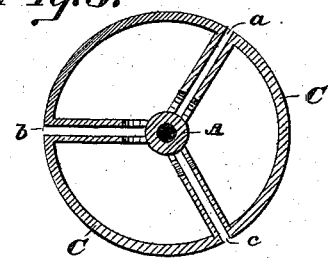
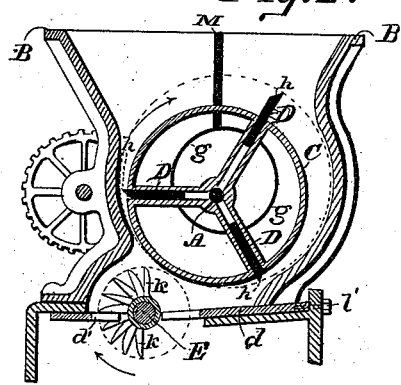
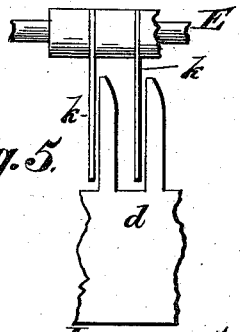
Attest:
Abram May
Charlie King
Inventors:
G. Oscar Rinman.
John Zimmerman,
By
L. M & Rm Hosea, Atty's.

UNITED STATES PATENT OFFICE.

G. OSCAR RINMAN AND JOHN ZIMMERMAN, OF CINCINNATI, OHIO; SAID RINMAN ASSIGNOR TO SAID ZIMMERMAN.

MEAT-CUTTING MACHINE.

SPECIFICATION forming part of Letters Patent No. 382,192, dated May 1, 1888.

Application filed August 12, 1884. Renewed February 1, 1888. Serial No. 262,666. (No model.)

*To all whom it may concern:*

Be it known that we, G. OSCAR RINMAN and JOHN ZIMMERMAN, citizens of the United States, residing at Cincinnati, Ohio, have invented new and useful Improvements in Meat-Cutting Machines, of which the following is a specification.

Our invention relates to meat-cutting machines of the class wherein a system of rotary knives passes through fixed combs, cutting the meat by a shearing cut similar to the action of a pair of shears; and it consists in certain improvements in the construction, and certain additions, making the action of the machine more efficient.

The style of machine to which we have particularly contemplated applying the improvements is the "Zimmerman Meat-Cutter," for which Letters Patent have been granted, dated January 11, 1881, No. 236,524. We do not, however, confine ourselves to such application.

The accompanying drawings illustrate our improvements, in which—

Figure 1 is a vertical cross-section through the center of the hopper of a meat-cutter; Fig. 2, a side elevation of the same; Fig. 3, a detached cross-section of force-feed cylinder, and Fig. 4 a detached view of the forcing arm or knife. Fig. 5 is a detail view.

Similar letters denote similar parts.

Reference being now made to the drawings, the meat-cutter consists of a frame or stand, F, embodying the combs $d\ d'$, and having a shaft, E, mounted on bearings in the sides of the frame, upon which is fastened the system of rotating knives $k$, adapted to rotate between the teeth of the combs in such manner that the substance it is desired to cut, lying on the comb $d$, will be sheared by the action of the knives against the sides of the comb-teeth adjacent to the shearing-edge of each knife, and carried through with them, the carrying-shaft E rotating meanwhile at high speed. The comb $d'$ retards the meat thus cut, preventing it from being carried around with the knives, and cleans them. These parts, with the hopper, are similar in construction to those described in the patent referred to above, and require no special description, except as hereinafter shown.

To adjust the comb $d$ laterally to make the machine cut fine or coarse, adjusting-screws $f\ f'$ are provided, acting either in the sides of the hopper B at the bottom, or in projecting lugs formed upon the base-frame F, as shown. Upon loosening one screw, $f$, and tightening the corresponding one, $f'$, the comb is shifted from left to right, or vice versa, thus causing the several comb-teeth to approach or recede from the shearing-edges of the adjacent rotating knives to cut fine or coarse, as required. The rotary knives being fixed to the shaft E, it is obvious that the machine will cut fine or coarse, according to the distance between the plane of the cutting-edge of each knife and the adjacent edge of the comb-tooth. Each knife has a shearing cut across the edge of the adjacent tooth, slicing the meat into thin or thick slices, according to the space between the vertical plane of the comb-tooth edge and the plane path of the knife-edge.

The cutting-comb $d$ is fastened to the frame F by set-screws, as shown at $l\ l'$, inserted in slots which permit lateral motion. Lost motion caused by the wearing of the knives is thus provided for.

The force-feed attachment consists of a shaft, A, mounted on bearings in the sides of the hopper B, to which is concentrically keyed a cylinder, C, having one or more radial arms provided with slots $a\ b\ c$, with parallel side walls, and extending from the periphery nearly to the carrying-shaft, and likewise extending the entire length of the cylinder and open at their ends.

The shaft A is externally geared to the shaft E by spur-gear, friction-rollers, &c., or it may be connected to an independent pulley and driven by a belt from the shaft overhead.

The cylinder C is of such length as to fit snugly between the ends of the hopper, but free to rotate therein, and is arranged to nearly impinge against one of its sides, leaving a wider space at the other.

Within the slots $a\ b\ c$ move radially-reciprocating arms or knives D, rectangular in shape, and of sufficient thickness to fill the slots and move without unnecessary friction, and of the length of the cylinder. Each arm has a beveled projecting outer edge, $h$, and is furnished near the extremities of opposite sides with pivots *e e*, projecting in the line of its length and adapted to fit and travel within circular grooves *g*, formed in the end walls of the hopper. The grooves *g* are formed eccentric to the axis of rotation of the shaft A, so that upon rotating the shaft and cylinder the arms D, with their pivots *e e* traveling in the grooves *g*, will be moved up and down once radially within the slotted cylinder C for every complete rotation. The guide-grooves *g* are struck out with such radius and the arms D made of such depth that when carried in the retrograde direction the outer edges, *h*, will lie flush with the surface of the containing-cylinder when the point of greatest retraction is reached. The opposite or point of greatest extension is so placed that the arms are farthest extended at a point somewhat beyond the perpendicular line. After passing this point the arms recede and the interior contour of the hopper approaches and conforms closely to the path thus described by the outer edges of the receding arms below the horizontal line and nearly to the comb *d*. Above the horizontal line the sides of the hopper may have any shape best adapted to assist the feed.

The shaft E is so placed with respect to the cylinder C that the cutting-knives *k* thereon approach nearest to the surface of the cylinder at the point of greatest retraction of the arms D, which will be at one side of the perpendicular line and opposite to the position of greatest extension above.

We preferably place the cutter-shaft E on the left of the center of the hopper B as in the figure, placing the forcing-cylinder C above it and a little to the right, adapting the feeding to take place at the right-hand side. Rotation of both shafts is thus in the same direction— *i. e.*, like the hands of a watch.

The inner contour of the left-hand side of the hopper below the horizontal line is, as before, adapted to the now gradually-projecting arms D, while, as before, the contour above the horizontal may be that best calculated to assist the feeding operation.

The operation of the machine can now be easily understood. Starting with one arm D in the horizontal position on the left, as in the drawings, where its edge *h* projects slightly beyond the surface of the cylinder, as it advances in the direction of rotation it projects more and cuts out a gradually-increasing slice of the material in the hopper, carries it forward, over, and down till the arm reaches the horizontal position on the right, when the edge *h* is now close to that side of the hopper. It then confines and forces the charge of material it has down upon the comb *d*, through which pass the knives *k*, rotating on the shaft E at high speed. The direction of motion of the knives *k* and of the surface of the cylinder at this point being opposite, the forcing effect is further increased, and as the arms a short distance beyond are entirely withdrawn, and the knives *k* passing close to the surface of the cylinder C, it will be seen that all the material carried around by the force-feed must be cut and removed from the cylinder, so that the arms reach the horizontal position again on the left cleaned and unclogged, ready for another operation.

We preferably provide three arms D, acting as described, and set one hundred and twenty degrees apart. Any convenient number, however, may be used without departing from the spirit of our invention.

Means for removing the arms D from the containing-cylinder are provided, consisting of vertical slots M, one in each side of the hopper, ordinarily closed by strips fastened therein, and connected with grooves *g*. Upon removing the strips and turning the cylinder until an arm D comes beneath the foot of the vertical slots, it can be easily withdrawn, the pivots *e* traveling in the vertical slots.

Having thus described our invention in construction and operation so that any one reasonably skilled in the art to which it pertains can construct and use the same, we claim and desire to secure by Letters Patent of the United States—

1. In a meat-cutting machine, the combination of a hopper, a horizontal-cylinder force-feed provided with radially-reciprocating arms D, and a rotary shaft carrying a series of cutting-knives below and in proximity to said cylinder, to cut the meat brought within range of the cutters by said arms, substantially as described.

2. In a rotary meat, beef-fat, or lard cutting machine, the combination of a series of parallel cutting-knives, *k*, mounted on a rotating shaft, E, and a comb, *d*, adjustable laterally by set-screws, for the purpose of adjusting the relative cutting-paths of the knives at a greater or less distance from the sides of the teeth, substantially as and for the purpose specified.

3. In a rotary meat-cutting machine provided with combs *d*, adjustable laterally, the set-screws *f f'*, for producing such adjustment, in combination with the holding-screws *l l*, inserted through slotted openings permitting such adjustment, substantially as described.

4. In a rotary meat-cutting machine, the combination of the force-feed mechanism, consisting of shaft A, cylinder C, having slotted openings *a b c*, and arms D, provided with pivots *e e* and having beveled edges *h*, the hopper B, constructed with curved interior surfaces, as described, and having the grooves in the ends thereof, and adapted to carry the shaft A, with cylinder C thereon, and adjustable combs adapted to be shifted laterally in relation to the knives, substantially as and for the purpose specified.

5. In a rotary meat-cutting machine, the combination of the shaft E, carrying the cutting-knives *k*, force-feed cylinder C on the shaft A, provided with radially-reciprocating arms D, and means, as described, for keeping said arms in close proximity to the respective left and right hand sides of the hopper B, substantially as and for the purpose described.

6. In a rotary meat-cutting machine, the combination of the shaft E, carrying knives $k$, and the shaft A, with cylinder C, carrying arms D on the hopper B, so that the knives $k$ will pass in close proximity to the surface of the cylinder C at the point where arms D have reached their greatest recession, the cylinder C so journaled that it shall be ahead of the cutting-knives $k$ in the direction of rotation, for the purpose of assisting the feeding and cutting operations, substantially as described.

In testimony whereof we have hereunto set our hands in the presence of two subscribing witnesses.

G. OSCAR RINMAN.
JOHN ZIMMERMAN.

Witnesses:
R. M. HOSEA,
ABRAM MAY.